United States Patent [19]

Cole

[11] 3,896,842

[45] July 29, 1975

[54] COMBINATION PUNCH AND VALVE TEE FITTING

[75] Inventor: Judson C. Cole, Tulsa, Okla.

[73] Assignee: Continental Industries, Inc., Tulsa, Okla.

[22] Filed: May 13, 1974

[21] Appl. No.: 469,101

[52] U.S. Cl. ................. 137/318; 137/560; 408/204
[51] Int. Cl. ....................... B23b 41/08; F16e 41/04
[58] Field of Search ............ 137/15, 315, 317, 318, 137/560; 285/197, 198, 199; 408/110, 204

[56] References Cited
UNITED STATES PATENTS

| | | | |
|---|---|---|---|
| 2,794,352 | 6/1957 | Mueller | 137/318 |
| 2,839,075 | 6/1958 | Mueller | 137/318 |
| 3,756,261 | 9/1973 | Minchhoff | 137/318 X |

*Primary Examiner*—Martin P. Schwadron
*Assistant Examiner*—David R. Matthews

[57] ABSTRACT

A combination punch and valve tee fitting for providing communication with the interior of a pipe main, including a tubular body adapted to be affixed to the pipe main and having an intermediate tubular outlet, the body having internal threads, a tubular plug valve member externally and internally threadably received in the tubular body, the upper end of the plug valve member having wrench engaging means whereby the plug valve member may be threadably positioned in the tubular body, the plug valve member having a seat at the lower end engagable with an annular body valve seat in the internal lower end of the tubular body, and an externally threaded cylindrical punch threadably received in the plug valve member, the lower end of the punch member having a punch surface thereon, the upper end of the punch member having a wrench receiving recess, the punch member having an upper end sealing surface sealably engagable with an annular plug valve member internal upper valve seat when the punch member is threadably upwardly positioned relative to the plug member to seal the fitting against flow therethrough.

5 Claims, 3 Drawing Figures

COMBINATION PUNCH AND VALVE TEE FITTING

BACKGROUND OF THE INVENTION

In the distribution of gas it is frequently necessary to attach a line from a customers residence or business to a gas main line. Devices have been developed for providing connection to a main line without the necessity of shutting down the line. As an example, the following patents show self-punching tee-fittings which may be employed for attaching a gas service line to a gas main: U.S. Pat. Nos. 3,247,862; 3,295,298; 3,561,298; 3,606,565.

The self-punching tee-fittings described in the above listed patents function satisfactorily to provide communication with a gas main. One problem which has existed with the known types of self-punching tee-fittings is that of providing complete closure after the gas main has been penetrated by the punch. All of the devices illustrated in the above mentioned patents are subject to leakage of gas flowing along the path of the threads on the interior of the tee. While leakage of gas at low pressure may be acceptable, leakage at high pressure may become hazardous. None of the known self-punching tee-fittings includes means for providing positive gas shut off against high gas pressure after a hole has been punched in a gas main. More specifically none of the known self-punching tee-fittings provide means of punching a hole in a gas main and subsequently affording complete leak proof sealable closure of the main.

OBJECTS OF THE INVENTION

The primary objects of the present invention is to provide an improved self-punching tee-fitting for gas mains. More particularly, an object of the invention is to provide a self-punching tee-fitting for gas main including improved means of closing the tee-fitting after communication is established with the main in an arrangement wherein positive sealed closure is obtained.

Another object of this invention is to provide a self-punching tee-fitting including a tubular plug valve member threadably received within the fitting body and threadably positionable between a lower position in which the plug valve member seal with the plug body and an upper position which permits free flow of gas through the tee-fitting to an outlet, and including a punch threadably received within the plug valve member postionable between an upper position in which it sealably engages the plug valve member and is a lower position wherein it can be rotated and threadably advanced to punch a hole in a pipe main to which the tee-fitting has been attached.

These objects as well as other objects, both more general and more specific, will be fulfilled in the following description and claims.

SUMMARY OF THE INVENTION

The invention is a self-punching tee-fitting having an upright tubular body threaded on the inside with an outlet extending radially therefrom. The lower end of the tee body is adapted to be affixed to a gas main, such as by welding to the exterior surface of the main. The interior of the tee body is threaded. Positioned within the tee body is a tubular plug valve member having an external threaded portion so that it can be threadably raised and lowered inside the tee body. The lower end of the plug valve member includes an annular seating surface which engages an annular valve seat inside the lower end of the tee body. When the plug valve member is threadably downwardly advanced the lower end seals against gas flow between the tee body and the plug valve member.

The interior of the tubular plug valve member is threaded and receives an externally threaded punch. Within the plug valve member is an annular valve seat which is sealably engaged by the upper end of the punch when it is threadably upwardly advanced relative to the plug valve member.

Thus, the plug valve member can be sealed against the interior of the tee body and the interior of the plug valve member can be sealed by the punch so as to completely seal the fitting against gas flow. When the plug valve member with the punch therein is upwardly positioned free passage exists between the lower end of the tee body and outlet so that, after a hole is punched in a gas main by the punch, and both the punch and the plug valve member are upwardly positioned, free gas flow can occur between the gas main and the tee body outlet. The invention thus provides a self-punching tee-fitting having means of punching a hole in a gas main and subsequently completely sealable closing against gas flow until flow is desired.

DESCRIPTION OF VIEWS

DETAILED DESCRIPTION

Figure 1:
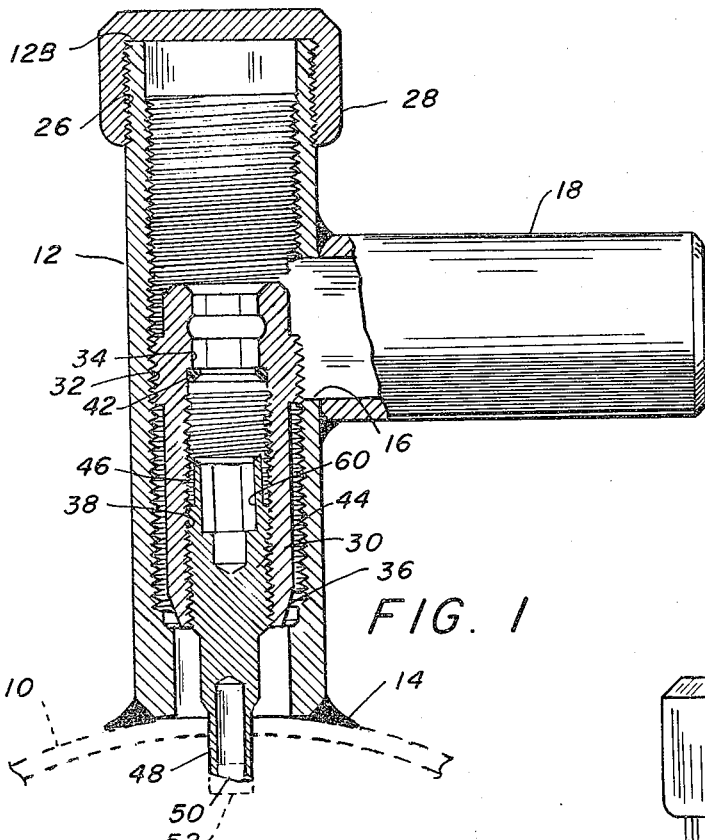
FIG. 1 is a elevational view in partial cross-section of a tee-fitting of this invention secured to the exterior surface of a gas main, the plug valve member and the punch are both downwardly threadably advanced as occurs when punching a hole in the gas main.

Referring to the drawings and first to FIG. 1 the apparatus of the invention is shown affixed to the surface of a gas main 10 shown in dotted outline, since the gas main is not part of the invention. The self-punching tee-fitting includes a tubular tee body portion 12 which extends radially of the gas main 10 and is typically secured to the gas main by means of welding 14, however, this is merely exemplary and other means may be utilized to attach the tee body portion 12 to the gas main 10.

The tubular body portion 12 includes an outlet opening 16 intermediate the body lower end 12A and body upper end 12B. Outwardly extending from the body 12 is a tubular outlet 18 which encompasses opening 16. The outlet 18 affords means of attaching a gas distribution line to the tee-fitting. In the typical application the self-punching tee-fitting is used to provide communication from the gas main 10 to a residence, building, or other user of gas and a smaller diameter gas line is normally secured to the outer end of tubular outlet 18.

Tee body portion 12 includes internal threads 20 which extend from the upper end 12B to near the lower end 12A. Near the lower end 12A, and below thread 20 is a body valve seat 22. Seat 22 is formed by a step in the interior tubular configuration of body 12, the internal diameter 24 below the seat 22 being reduced.

The upper external portion of body 12 is provided with external threads 26 which receives an internally threaded pipe cap 28.

Positioned within the tee body 12 is a tubular plug valve member 30. External threads 32 are provided on the plug valve member which engage the internal threads 20 of the tee body so that by rotation of the plug valve member 30 it can be threadably advanced upwardly and downwardly within the tee body. The upper internal end of the plug valve member includes wrench receiving means 34. This is in the form of a non-circular wall configuration of the tubular opening, either square, hexagonal, octagonal, or so forth, although the usual means is to provide a hexagonal internal configuration 34 which receives a standard hexagonal Allen wrench. With cap 28 removed the plug valve member 30 can be easily positioned within the tee-body by means of an Allen wrench.

Figure 2:
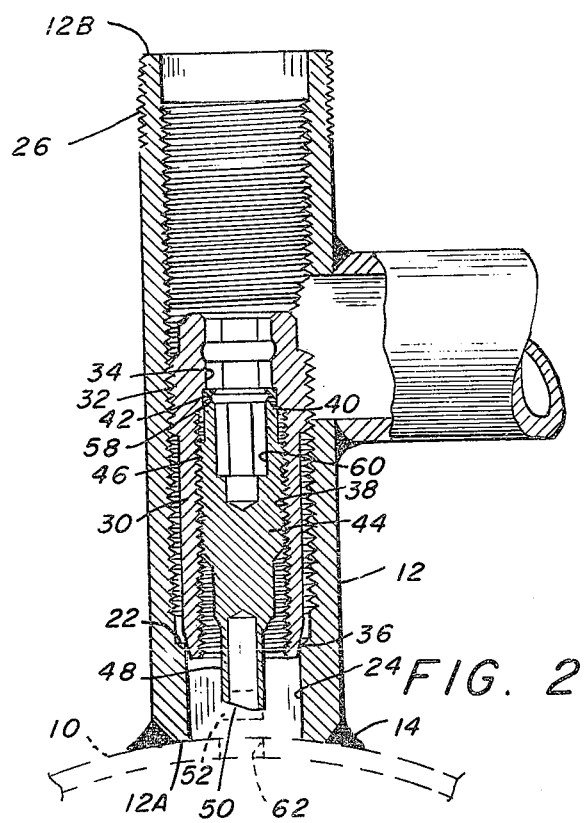
FIG. 2 is a partial cross-sectional view as shown in FIG. 1 showing the plug valve member and the punch both in the sealed position so that gas flow from the gas main is completely sealed off.

The lower external end of the plug valve member includes a tapered seat portion 36. When the plug valve member is threadably downwardly advanced within the tee-body, as shown in FIG. 2, the seat portion 36 sealably engages the body valve seat 22 so as to provide leak proof engagement of the plug valve member with the body 12.

The lower internal tubular portion of the plug valve member is provided with internal threads 38. Between threads 38 and the upper wrench receiving means 34 is a plug valve member seat 40. This valve seat 40 may be of a metal seat, such as seat 22 and the tee body portion 12, or as illustrated, may include the use of a resilient gasket seal 42.

Positioned within the plug valve member 30 is a punch 44 having external threads 46 which engage the internal threads 38 of the punch valve member.

The lower end of punch valve 44 includes a reduced diameter punch portion 48 terminating in a punch end face 50. When the punch 44 is rotated and thereby downwardly threadably positioned so that the punch face 50 engages gas main 10, a hole 62 is formed in the gas main, cutting out a plug 52.

The upper end 58 of the punch forms a punch sealing surface 58 which sealably engages the resilient gasket seal 42 when the punch is upwardly threadably advanced relative to the plug valve member.

In the upper end of punch member 44 is a wrench receiving recess 60, which is of a non-circular configuration, such as square, hexagonal, octagonal or so forth. As with the wrench receiving means 34 of plug valve member 30, the wrench receiving recess 60 is preferably of a hexagonal configuration to receive an Allen wrench. The diameter of the Allen wrench received in recess 60 is smaller than that received by wrench means 34. Thus, an Allen wrench may be inserted in the upper end of the punch through the wrench receiving means 34 of the plug valve member to rotate the punch. The punch 44 and the plug valve member 30 are individually rotatable within the punch body.

OPERATION OF THE DEVICE

When it is desired to provide an outlet to a gas main 10 the lower end 12A of the tee body 12 is secured to upper surfaces of the main in a manner so that the tee body portion extends radially from the main. This is typically accomplished by welding 14.

Cap 28 is removed and an Allen wrench (not shown) is lowered into the upper end of the tee body to engage the plug valve member wrench surface 34. The plug member is threadably downwardly advanced into the lower end of a tee body as shown in FIGS. 1 and 2.

A smaller Allen wrench is inserted into the upper end of the tee body to engage the wrench receiving recess 60 in punch 44. The punch is rotated downwardly. The punch end face 50 engages main 10 and forces a hole in the main in a method revealed in the prior art and described in detail in the patents which have previously been referred to. After the hole 62 has been punched in the main 10 punch member 44 may be rotated in the opposite direction withdrawing it so that the hole 62 is cleared and free communication is provided between the interior of the main 10 and the interior of the tee body 12.

To seal the tee body against gas leakage the plug valve member 30 is advanced downwardly by the use of an Allen wrench until the plug valve member seal surface 36 engages the body valve seal 22. Next, punch 44 is upwardly threadably advanced within the plug valve member until the upper punch sealing surface 58 engages the gasket seal 42. In this condition, the tee-fitting is completely sealed and prevents leakage of gas. It is to be noted that sealing does not depend upon the close fitting of threads. Seal is accomplished by engaged seating surfaces. In the illustrated embodiment a resilient gasket seal 42 is employed to seal between the punch 44 and the plug valve member 30 however, a metal to metal seal may be employed in this location as is employed between the seal surface 36 of plug valve member and the body valve seat 22. In like manner, a resilient gasket could be employed in the body valve seat 22 if desired.

Figure 3:
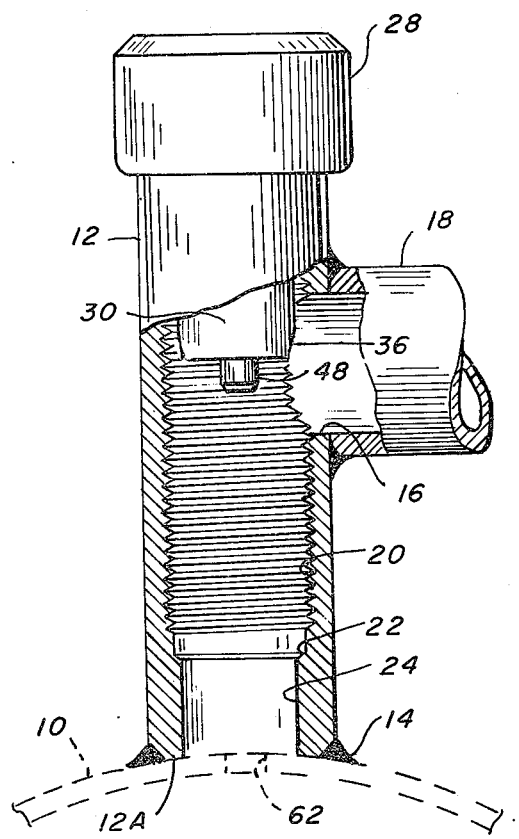
FIG. 3 is a partial cross-sectional view as shown in FIGS. 1 and 2 showing the plug valve member and punch withdrawn so as to provide free communication between the interior of the gas main and the tee outlet and showing a cap closing the upper end of the tee body.

When it is necessary to provide free communication between the interior of the gas main 10 and tubular outlet 18, the plug valve member 30 is threadably upwardly advanced to the position as shown in FIG. 3. Since in this position no sealing surfaces between the plug valve member and the interior of the tee body are provided leakage could possibly occur between threads 20 and 32. To prevent leakage a cap 28 is secured to the upper end of the tee body.

The invention fulfills all of the objectives initially set forth and overcomes the problems with existing self-punching tee-fittings. The invention provides an improved self-punching tee-fitting having means of insuring a leak proof closure of the gas main after an opening has been provided in it. At any time it is desired to close communication between the gas main and the tubular outlet 18 the punch and plug valve member may be utilized together as a valve.

While the invention has been described with a certain degree of particularity it is manifest that many changes may be made in the details of construction and the arrangement of components without departing from the spirit and scope of the disclosure. It is understood that the invention is not limited to the embodiment set forth herein for purposes of exemplification, but it is to be limited only by the scope of the attached claim or claims, including the full range of equivalency to which each element thereof is entitled.

What is claimed is:

1. A self-punching tee-fitting for providing communication with the interior of a pipe main, comprising:

a tubular body having means at the lower end thereof for affixing to a pipe main, and having an outlet opening intermediate the ends encompassed by a tubular outlet adaptable to receive the connection of a distribution pipe thereto, the tubular body having internal threads, and an internal valve seat below the threads and below the outlet opening;

a tubular plug valve member having external threads threadably received in said tubular body, the upper end of the plug valve member having wrench engaging means whereby the plug valve member may be threadably positioned in said body, the plug valve member having a seat portion sealably engagable with said body valve seat when the plug member is threadably downwardly advanced, the plug member having internal threads in the lower portion thereof and an internal valve seat above the threads; and an externally threaded cylindrical punch threadably received in said plug valve member, the lower end of the punch having a punching surface thereon, the upper end of the punch having wrench receiving means, the punch having a sealing surface sealably engagable with the said plug member internal valve seat when the punch is threadably upwardly positioned relative to said plug member, whereby when the punch is downwardly threadably advanced it punches a hole in a pipe main to which the body is affixed, and wherein free communication is provided for gas flow out said body outlet opening when the plug valve member is upwardly threadably positioned.

2. A self-punching tee-fitting according to claim 1 including a resilient valve seat element received in said tubular plug valve member forming said internal valve seat, the resilient valve seat being sealably engaged by said punch member sealing surface as it is upwardly threadably advanced relative to said plug valve member.

3. A self-punching tee-fitting according to claim 1 wherein said plug valve member seat portion is in the form of an externally tapered lower end configuration.

4. A self-punching tee-fitting according to claim 2 wherein said punch sealing surface is in the form of a reduced thickness upper tubular end surface which sealably contacts said resilient valve seat when the punch is upwardly threadably advanced relative to said plug valve member.

5. A self-punching tee-fitting according to claim 1 wherein said tubular body is externally threaded at the upper end thereof, and including an internally threaded cap received thereon.

* * * * *